US010878361B2

(12) United States Patent
Tanwir et al.

(10) Patent No.: US 10,878,361 B2
(45) Date of Patent: Dec. 29, 2020

(54) SYSTEM AND METHOD TO GENERATE INTERACTIVE USER INTERFACE FOR VISUALIZING AND NAVIGATING DATA OR INFORMATION

(71) Applicant: NETSUITE INC., San Mateo, CA (US)

(72) Inventors: Umar Tanwir, Kitchener (CA); Simon Clark, Guelph (CA); Marilou Mercier-Genest, Lac-Beauport (CA); Austin Partridge, Waterloo (CA)

(73) Assignee: NETSUITE, INC., San Mateo, CA (US)

( * ) Notice: Subject to any disclaimer, the term of this patent is extended or adjusted under 35 U.S.C. 154(b) by 348 days.

(21) Appl. No.: 15/183,418

(22) Filed: Jun. 15, 2016

(65) Prior Publication Data
US 2017/0235466 A1 Aug. 17, 2017

Related U.S. Application Data

(60) Provisional application No. 62/181,042, filed on Jun. 17, 2015.

(51) Int. Cl.
*G06Q 10/06* (2012.01)
*G06F 9/451* (2018.01)
*G06F 3/0481* (2013.01)
*G06Q 10/10* (2012.01)

(52) U.S. Cl.
CPC ......... *G06Q 10/067* (2013.01); *G06F 3/0481* (2013.01); *G06F 9/451* (2018.02); *G06Q 10/105* (2013.01)

(58) Field of Classification Search
None
See application file for complete search history.

(56) References Cited

U.S. PATENT DOCUMENTS

| 6,377,287 | B1 * | 4/2002 | Hao | G06F 17/30994 |
| | | | | 707/E17.142 |
| 9,461,972 | B1 | 10/2016 | Mehta | |
| 9,817,991 | B2 | 11/2017 | Boncha et al. | |
| 2007/0129977 | A1 * | 6/2007 | Forney | G06F 17/30873 |
| | | | | 715/745 |
| 2009/0006427 | A1 * | 1/2009 | Veeraraghavan | G06Q 10/00 |
| 2011/0138340 | A1 * | 6/2011 | Holm-Petersen | G06Q 10/06 |
| | | | | 715/854 |
| 2011/0276890 | A1 * | 11/2011 | Jensen-Horne | G06F 9/5061 |
| | | | | 715/738 |

(Continued)

*Primary Examiner* — Christopher J Fibbi
(74) *Attorney, Agent, or Firm* — Kraguljac Law Group, LLC

(57) ABSTRACT

Systems, apparatuses, and methods for visualizing, navigating within, and interacting with data, typically organizational related data. In one embodiment, the invention may be implemented in conjunction with a business data processing system or platform. Such a system or platform may be a multi-tenant business data processing system that provides data storage and data processing capabilities for users. The data stored and/or processed may include one or more of ERP (Enterprise Resource Planning), CRM (Customer Relationship Management), HR/HCM (Human Resources/Human Capital Management), or financial business-related data.

20 Claims, 13 Drawing Sheets

(56) References Cited

U.S. PATENT DOCUMENTS

| | | | |
|---|---|---|---|
| 2012/0110508 A1* | 5/2012 | Bullen | G06Q 10/06 |
| | | | 715/825 |
| 2012/0311474 A1* | 12/2012 | McPherson | G06F 17/30572 |
| | | | 715/771 |
| 2016/0132215 A1* | 5/2016 | Zhang | G06F 3/0481 |
| | | | 715/781 |
| 2016/0239768 A1* | 8/2016 | Jones | G06Q 10/0631 |
| 2017/0235436 A1 | 8/2017 | Hooton et al. | |
| 2017/0236081 A1 | 8/2017 | Grady Smith et al. | |
| 2017/0236131 A1 | 8/2017 | Nathenson et al. | |

* cited by examiner

SYSTEM AND METHOD TO GENERATE INTERACTIVE USER INTERFACE FOR VISUALIZING AND NAVIGATING DATA OR INFORMATION

CROSS REFERENCE TO RELATED APPLICATION

This application claims the benefit of U.S. Provisional Application No. 62/181,042, entitled "System and Method to Generate Interactive User Interface for Visualizing and Navigating Data or Information," filed Jun. 17, 2015, which is incorporated by reference herein in its entirety (including the Appendix) for all purposes.

BACKGROUND

As businesses or organizations age, they typically generate more and more information and data related to their operations, history, and decision processes. Much of this information and data may be valuable in and of itself; however, it may also be capable of providing insights into the business or organization when considered together with other data. Because of this possibility, data mining and various forms of data display and analysis have become important tools for managers, employees, customers, and others interested in learning more about a business or organization.

Conventional data display or visualizations methods include tree structures, networks, lists, menus, etc. One common aspect of such methods for presenting data is that they are dependent on a hierarchical relationship between different data or data types, so that one category or type of data can be nested beneath or inside of another. While useful, this requirement limits the application of such data visualization methods, as such methods may not be applicable for effectively representing other forms of relationships between data or for "discovering" important associations.

For example, conventional organization charts tend to focus on hierarchical relationships such as employee hierarchies or lines of authority, and may combine with that other HR data elements, such as job titles/locations/skills within the charts. While useful, these types of visualizations are constrained by the fact that the primary objects must be in a hierarchical relationship to be visualized. As recognized by the inventors, there are no conventional solutions that are versatile or generic enough to visualize other types of relationships between data objects, and not just hierarchical reporting relationships.

Furthermore, a user of a business data processing platform's software may find it difficult to understand connections between objects without viewing a number of different pages. The lack of readily understandable connections also makes navigation between these objects difficult. Forcing users to navigate between objects by visiting multiple pages makes it difficult for them to visualize how the objects are related or impact each other, thereby preventing an understanding of relationships and obtaining the synergistic benefits of a broader yet more detailed overview (which is expected to lead to improved decisions within the organization).

Conventional solutions to these problems involve multiple tables of data, navigated via hyperlinks with page reloads. However, context may be lost or at least made more confusing when switching between levels of data. Further, the information is difficult to digest and the navigation process is unintuitive.

Embodiments of the invention are directed toward solving these and other problems individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, required, or essential features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments of the invention are directed to systems, apparatuses, and methods for visualizing, navigating within, and interacting with data, typically organizational related data. In one embodiment, the invention may be implemented in conjunction with a business data processing system or platform. Such a system or platform may be a multi-tenant business data processing system that provides data storage and data processing capabilities for users. The data stored and/or processed may include one or more of ERP (Enterprise Resource Planning), CRM (Customer Relationship Management), HR (Human Resources), or financial business-related data.

In some embodiments, the inventive system, methods, and data visualization may provide at least one or more of the following features or capabilities, for example by generating and enabling user interaction with a suitable user interface and display:

Visualize: an ability to visualize multiple objects and understand how they are related to one another (e.g., jobs, organizations, locations, employees, skills, competencies, goals, etc.);

Navigate: the ability/functionality to more easily navigate or browse between objects based on how they are related to one another (Manager to a Direct Report—to that person as an Employee—to that person's work related goals—to other individuals in the organization who share the same goals);

Zoom: the ability to zoom in to see additional details (for example, from a large number of objects with limited information to a zoomed-in view where the user focuses on fewer objects but is presented with detailed information about the objects/parameters);

Heat Maps: the ability to locate objects visually through searching and highlight areas of interest in a heat map type display/concept (e.g., highlight/identify jobs where the location of the job is in Canada and/or employees who have a specific skill); and Dynamic Focus: the ability to change the visualization's focus from one object to another during the navigation process; this operates to retain a central focus while visualizing related objects in the background.

In one embodiment, the invention is directed to a system for generating a user interface, the interface enabling a user to visualize data and relationships between data, and to navigate between the visualized relationships, where the system includes:
- an electronic data storage element containing data related to an organization, the data including data associated with a plurality of entities that are part of the organization and data generated by a plurality of applications operating on the data associated with the plurality of entities;
- an objects browser, the objects browser operating to render a visualization of a plurality of objects by executing a set of instructions, wherein rendering the visualization further comprises determining how to display each of the plurality of objects in relation to other of the plurality of objects;
- a process executed by an electronic data processing element to determine a set of data contained in the electronic data storage element to be used for generating an initial visualization for the user;
- a process executed by the electronic data processing element to cause the objects browser to render the initial visualization;
- a process to receive from the user an input indicative of an operation that the user wishes the objects browser to perform on the initial visualization;
- a process executed by the electronic data processing element to determine a context in which the user wishes to view the set of data used for generating the initial visualization;
- a process executed by the electronic data processing element to, based on determining the context in which the user wishes to view the set of data, access data associated with an entity in that context; and
- a process executed by the electronic data processing element to cause the objects browser to render a visualization of a plurality of objects contained in the accessed data.

In another embodiment, the invention is directed to a multi-tenant data processing system, where the system includes:
- one or more business related data processing applications installed in the system and accessible by a plurality of tenants of the multi-tenant data processing system;
- an electronic data storage element coupled to the one or more business related data processing applications;
- an electronic processor programmed with a set of instructions, wherein when executed by the processor the instructions cause the system to
  - instantiate an objects browser, the objects browser operating to render a visualization of a plurality of objects by executing a set of instructions, wherein rendering the visualization further comprises determining how to display each of the plurality of objects in relation to other of the plurality of objects;
  - execute a process to determine a set of data contained in the electronic data storage element to be used for generating an initial visualization for the user;
  - execute a process to cause the objects browser to render the initial visualization;
  - execute a process to receive from the user an input indicative of an operation that the user wishes the objects browser to perform on the initial visualization;
  - execute a process to determine a context in which the user wishes to view the set of data used for generating the initial visualization;
  - execute a process to, based on determining the context in which the user wishes to view the set of data, access data associated with an entity in that context; and
  - execute a process to cause the objects browser to render a visualization of a plurality of objects contained in the accessed data.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which.

Note that the same numbers are used throughout the disclosure and figures to reference like components and features.

DETAILED DESCRIPTION

Figure 1:
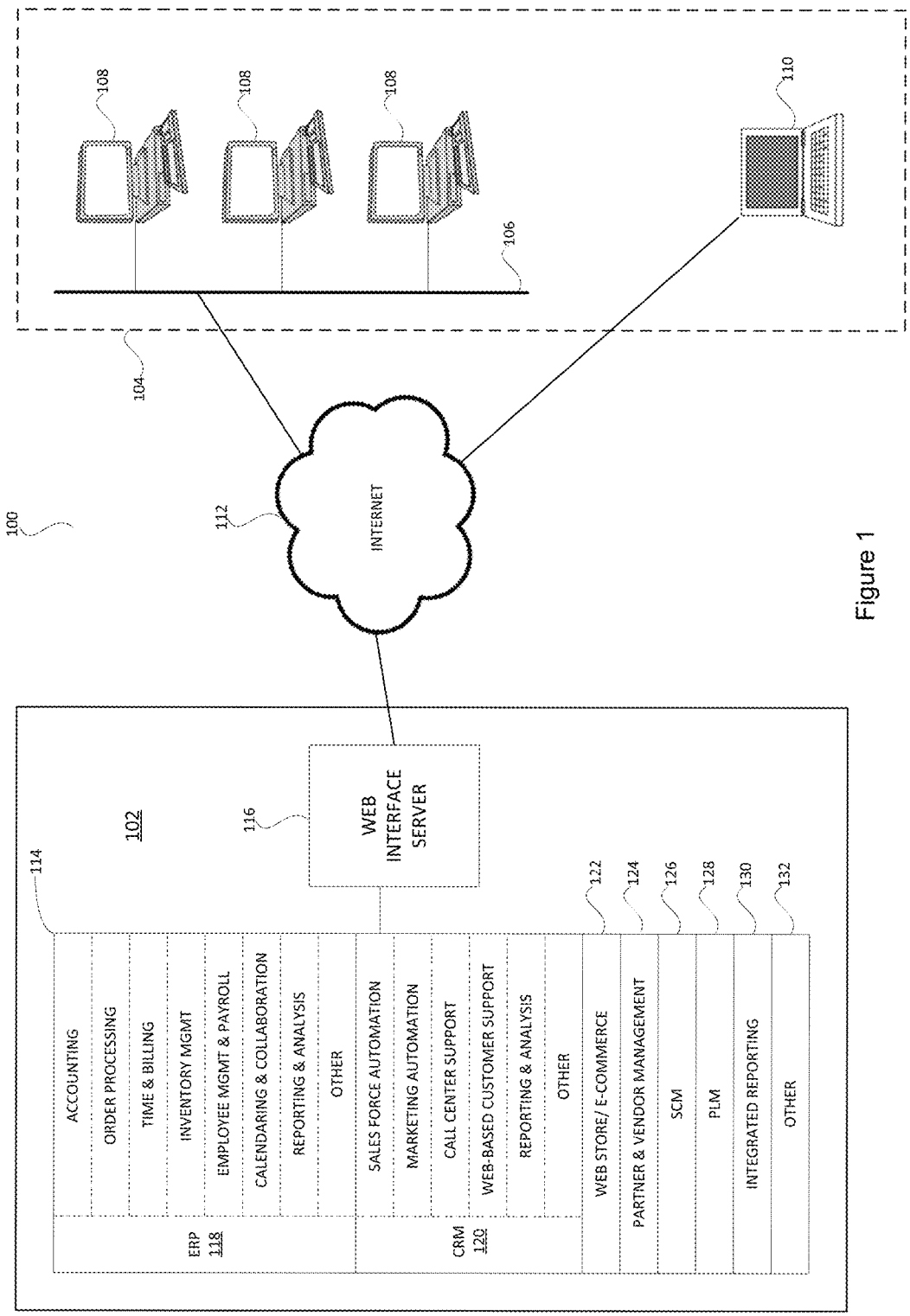
FIG. 1 is a diagram illustrating a system, including an integrated business system and an enterprise network in which an embodiment of the invention may be implemented.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc.) that is part of a client device, server, network element, or other form of computing or data processing device/platform and that is programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

Embodiments of the present invention are directed to systems, apparatuses, and methods for visualizing data, specifically data related to the operation of a business. Such data may include one or more of ERP, CRM, HR, eCommerce, or financial data, although implementation of an embodiment of the invention is not limited to use with such types or sources of data.

In some embodiments, the design and architecture of an underlying data base may provide or contribute to providing certain of the advantages or capabilities of the inventive user interface and supporting functions. For example, the single data source that the inventive system uses across all possible interactions, both internal and external (which results from implementing an integrated ERP, CRM, eCommerce, etc. based system that utilizes a single data source to provide synergistic and other benefits) enables certain of the beneficial aspects of an embodiment of the inventive system and methods. Further, note that:

For eCommerce applications, having a single record associated with each item provides current information about availability, sales, pricing, location, etc. on a per item basis; and In general, having a database or data store containing data that is accessed by multiple types of applications is significant in enabling the discovery of relationships, associations, or correlations between factors across categories of data used in different applications (consumer spending, browsing, inventory levels, sales associates, messaging methods, methods of presenting information, etc.), where some of these relationships, etc. might otherwise not be discernible.

Embodiments of the inventive system and methods may include one or more of the following aspects, elements, or capabilities when implemented. The inventive engine that provides the object browsing capabilities and the visualization "widget" that requests/accesses the data from the engine and renders the UI for the user to view and navigate within the data and its representations may incorporate one or more of the following elements, data structures, or data processing capabilities:

A Suitable Data Model for Use in Implementing an Embodiment of the Inventive System and Methods The data model is the translated representation of the object data that is passed to the inventive visualization engine. It would typically be represented in transport as a single JSON file. Objects within the data model would be interlinked through a series of object-type specific hash tables keyed on the object's GUID or URI. Relationships belonging to an object would be represented in the data model by a collection of keys that can be used to retrieve the object records from the hash table. All data belonging to an object directly (e.g., name, description, image, etc.) would be represented in the object's record in the data model. Connection(s) between objects would be stored in a field on each object. The connection(s) may be represented by nested arrays, keyed first on the type of object, and next on the key of the object being linked to. Extra metadata regarding the connection (e.g., weight, frequency, direction, etc.) may be stored in the connection data. This structure makes retrieval of an object's direct and secondary relationships relatively fast and easy, and allows for the representation of arbitrarily complex data.

A Database Containing Multiple Data Types (Typically Business Data, Such as ERP, CRM, HR, Financial, Etc. Data Types Used in the Operation and Administration of a Business)

Most of the data being accessed and retrieved would be in the common database used as part of a multi-tenant system, or another form of a single database which houses the data from multiple business areas/functions (ERP, CRM, HR, Financial, etc.). This means data can be retrieved from any of the modules/applications as long as the requesting user is authenticated and authorized to retrieve that data or record. Additional data for objects not tracked by the traditional system (these could be stored in a third-party system, such as wiki pages, user manuals, chat transcripts, technical drawings, etc.) may be referenced in a custom table in the database to maintain properly linked relationships with existing data. This externally linked data can be retrieved through APIs which would structure the data for the presentation layer or may be structured on the fly before pushing it to the client. The original data remains on the external system, so as to maintain a definitive single authority on that data.

One or More Platform Applications that Treat Data as Similar at Some Level of Interaction/Processing Different data objects may be interpreted and treated differently at the presentation layer. Depending on the object or record type (for example, employee vs. role/position vs. warehouse vs. location, etc.) it may be rendered in a specific visualization for purposes of consistency. Also, depending on the zoom level, different attributes of the object will be displayed as shown in the UI examples described in the present application.

Note that the association between an object's attributes, values, or other parameters and what is presented to a user may be different for different users/roles (or based on another factor, such as business cycle, current values of specific data on the platform, a rule in a rule base that is triggered by a certain event or status, etc.), and also may be determined by a default value or by specific rules or application of thresholds.

Overview of an Example Embodiment of the Inventive System

Figure 4:
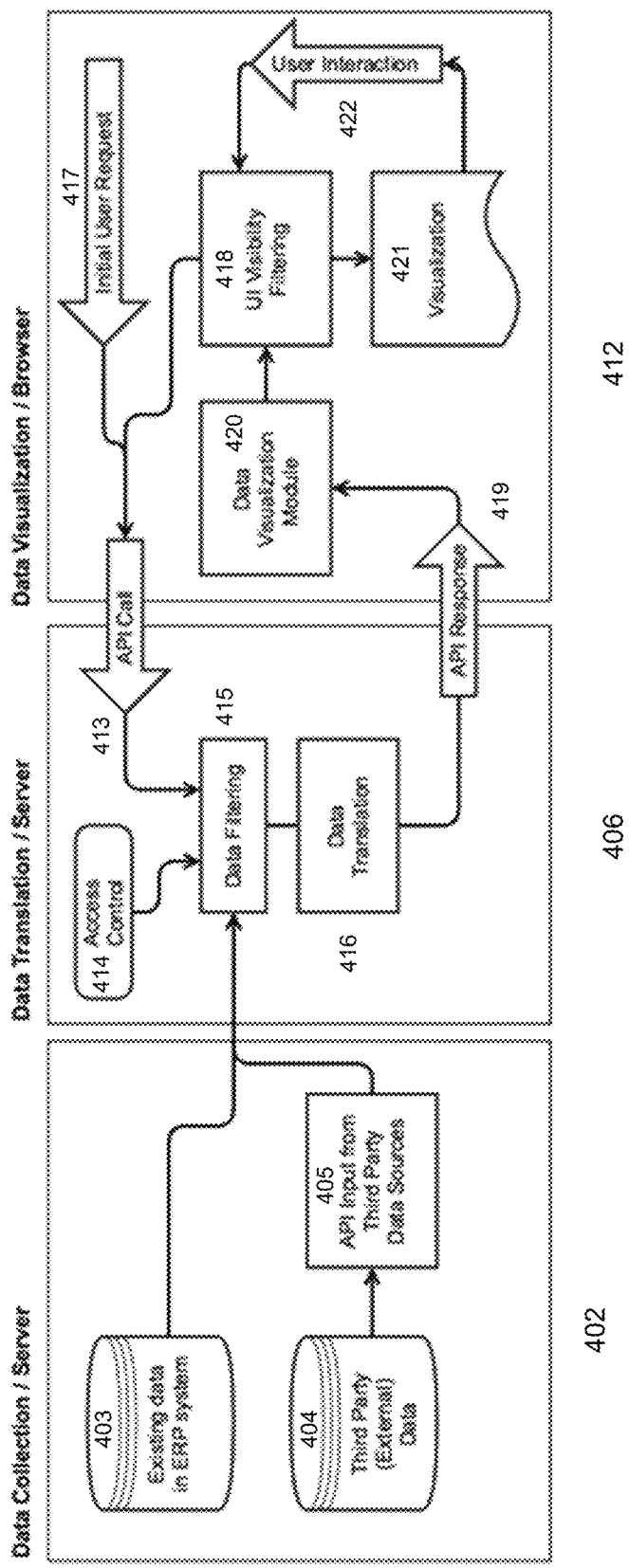
FIG. 4 is a diagram illustrating the primary functional elements or processes that may be present in an implementation of an embodiment of the inventive system and methods.

In some embodiments, an embodiment of the inventive data object browser may be built with a browser-based JavaScript visualization module that retrieves data from the systems via API calls to the data translation layer. In some embodiments, the overall inventive system 400 may include the following primary functional and/or operational modules, as illustrated in FIG. 4:

Data Collection (as Suggested by Module/Layer 402 of the Figure)

The inventive Object Browser is a tool for visualizing data. The underlying business data processing platform or system (as suggested by element 403) contains information regarding the people, places, roles, customers, and other entities that make up an organization. As an example, such data may include information regarding inventory, sales, revenue, organizational structure, calendar appointments, human resources, or other operational aspects of an organization, business, or company. Interconnections between these entities (i.e., as the entities are represented by the data items) are possible to infer or construct from the data, or obtain from another source (such as a user if the business data is hosted externally to the user). Access to third party data (i.e., data outside of the ERP or other system(s); for example, internal systems at a user's location or data that exists in other vendor's systems, as suggested by element 404) may be registered or acquired through an extensible API (as suggested by element 405), allowing the use of arbitrary types of objects.

Interconnections between these entities may refer to the management or co-working relationships between two employees, a residency relationship between an employee and a location, a SKU and its warehouse bin location, or ownership between a tool and the department it belongs to. A relationship between two entities in the system is typically reflected in the data as an interconnection. For some objects in the system, the interconnection necessarily exists already (as would be the case between inventory, and a bin location in the warehouse). Other relationships, such as interpersonal collaborations, may not exist explicitly and may need to be inferred by a separate system or by the application of statistical analysis, network analysis, or machine learning to data representing interactions, appointments, etc.

Data Translation (as Suggested by Module/Layer 406 of the Figure)

In operation, the Visualization module (as suggested by element 412) places an API call (as suggested by step or action 413) to retrieve data from Data Translation module/layer 406. Typically, this request (413) specifies the desired context of the requested data; this is important as the set of data returned for the same entity may (and generally will) differ depending upon the application or context. In this regard, note that ERP, CRM, HR or a Warehouse management context, for example, would be expected to return different sets of data, even for the same entity.

The request (413) typically also specifies one or more of the following:
 (1) the type/level of data that is required (e.g., the level of granularity or resolution), for example:
  granular data (i.e., entity or unit sized) such as employee data or meeting room information; or
  overview data (i.e., group based data), such as locations and their related employees, total resources, total available resources, etc.;
 (2) if at all, how the accessed data is to be processed or filtered (as suggested by element or process 415); e.g., show only terminated employees, or only available rooms); and
 (3) what format the requested data is to be provided in (XML, JSON, etc.).

Note that in some embodiments, the API call to the data translation module may integrate or coordinate with the operation of an existing access control system (as suggested by element or process 414) to restrict returned or accessed data to only that which the user is allowed to see (based on confidentiality, privacy, a user's job assignment, etc.), as well as limiting access to data based on the role(s) that the user occupies. For instance, if a user is restricted to only being able to access HR or other personnel records for their location or for employees that report directly to them, these access limitations would be reflected in the data returned in response to the user's request. In some cases, prebuilt schemas for the data may exist on the server, allowing for optimal retrieval and transmission of the data.

The client side can make requests for data from the server-side system. For common requests, or requests where performance is an issue, preformatted requests may be used, allowing for the request format to be cleaner, and potentially allowing the server side to pre-calculate and cache parts of the response. API calls may also include an authentication token or "key", which may be used to verify that the user requesting the data has permission to access certain data, records, directories, files, etc.

In general, data objects for the inventive object browser would be composed of data already in the system or platform for native objects, along with any data collected through the API for non-native objects. Interconnections (such as relationships, associations, or correlations) between entities would be built once the data has been retrieved, and may be represented in the schema as key references, so as to survive the serialization to XML or JSON data.

In a traditional hierarchical tree, objects only exist in one place (i.e., they have one "parent" and 0 or more "children"). These types of structures can be represented as a typical parent-child node tree, and there is no need for a more complicated structure to describe the full extent of the interconnections. However, with a massively interlinked dataset, the relationships can no longer be described by containing child entities within the description for the parent. In this situation, it makes sense to move to a key-value pair representation of the data, and to represent the inter-relationships by referencing the target object's key. In addition to allowing or denying access to the data, Data Translation layer 406 may also be responsible for removing sensitive information that the requester should not be able to see, and/or anonymizing sensitive data (so as to comply with any relevant regulations, such as HIPAA).

Data Transfer (in General)

In some embodiments, once Data Collection layer 402 has built the appropriate data set, it will be serialized using either JSON or XML, and sent back to the client machine in the response body of the request (as suggested by element or process 419). All data transfer will preferably happen over HTTPS or an equivalent security protocol, thereby protecting it from tampering and interception.

Visualization/Presentation (as Suggested by Module/Layer 412 of the Figure)

In some embodiments, the Data Visualization module or layer may be implemented in whole or in part as a JavaScript engine that takes raw data from the Data Collection layer 402, applies filtering or further data processing via elements or processes within the Data Translation layer 406, and generates a visually appealing, interactive representation that the users will view in their browsers. Note that there are a number of third party libraries that can be leveraged to simplify the solution; notably D3.js and (to a lesser extent) raphael.js simplify the process of working with SVG graphics within a browser, which would be an optimal method of providing the user experience.

Additional Information Regarding Operation of Modules Illustrated in FIG. 4:

- Element 416—Data Translation—Data retrieved from the database, and managed natively on the server cannot be passed, unaltered, to the client side. References and pointers will be lost, and text encoding may be different. A transport schema, such as JSON or XML should be used, and memory pointers should be resolved into a format that can survive serialization.
- 420—Data Visualization Module—Consists of the Visibility filtering and visualization engines. Takes the data from the server as input, and delivers SVG or DOM elements as output.
- 418—UI Visibility Filtering—The server side code will send more data (via JSON than is strictly necessary for the initial view of the data, so that manipulation of the view within its current context can be done without making extra calls to the server. The UI Visibility filter is responsible for deciding, based on context, what the current focus should be.
- 421—Visualization—The visualization engine turns the data passed from the filter into a visual set of DOM elements, either in HTML, SVG, or possibly something like VRML.
- 422—User Interaction—Certain elements in the user interface will be active, and can be used by the user to change the current state of the visualization, to focus on other elements, or to change the context entirely.

Embodiments of the invention may use a series of view objects that take the data from the API call and render it in different ways (e.g., bubble chart, line and spoke, 3D point cloud, etc.). Each view may be associated with a predefined set of behaviors that can control how the data is visualized, what parts are interactive, what the user can do with them, what different actions happen on click, scroll, zoom, etc. This would allow building a series of different, re-usable views that will adapt for different data types or formats being passed into the inventive system.

By providing the user with a wide variety of visualizations for the data set they are using, embodiments of the inventive system provide a tool to identify and focus on the data that is important to them. Some visualizations are better for focusing on the objects, others for focusing on the interrelationships between objects. Graph node optimizations that can be applied will further cause clustering of related nodes based on a variety of criteria and may assist in identifying relevant data or relationships.

In some embodiments, the inventive system and methods may utilize specific algorithms or data processing techniques (typically that are implemented within elements 418 and 421) for optimizing the "clumping" of data within large data sets when the view is "zoomed out" to encompass the entirety of the data, and for pruning non-visible data when the view is "zoomed in". This is to present a less confusing interface for the user and to keep render times lower by being less computationally demanding.

Figure 5:
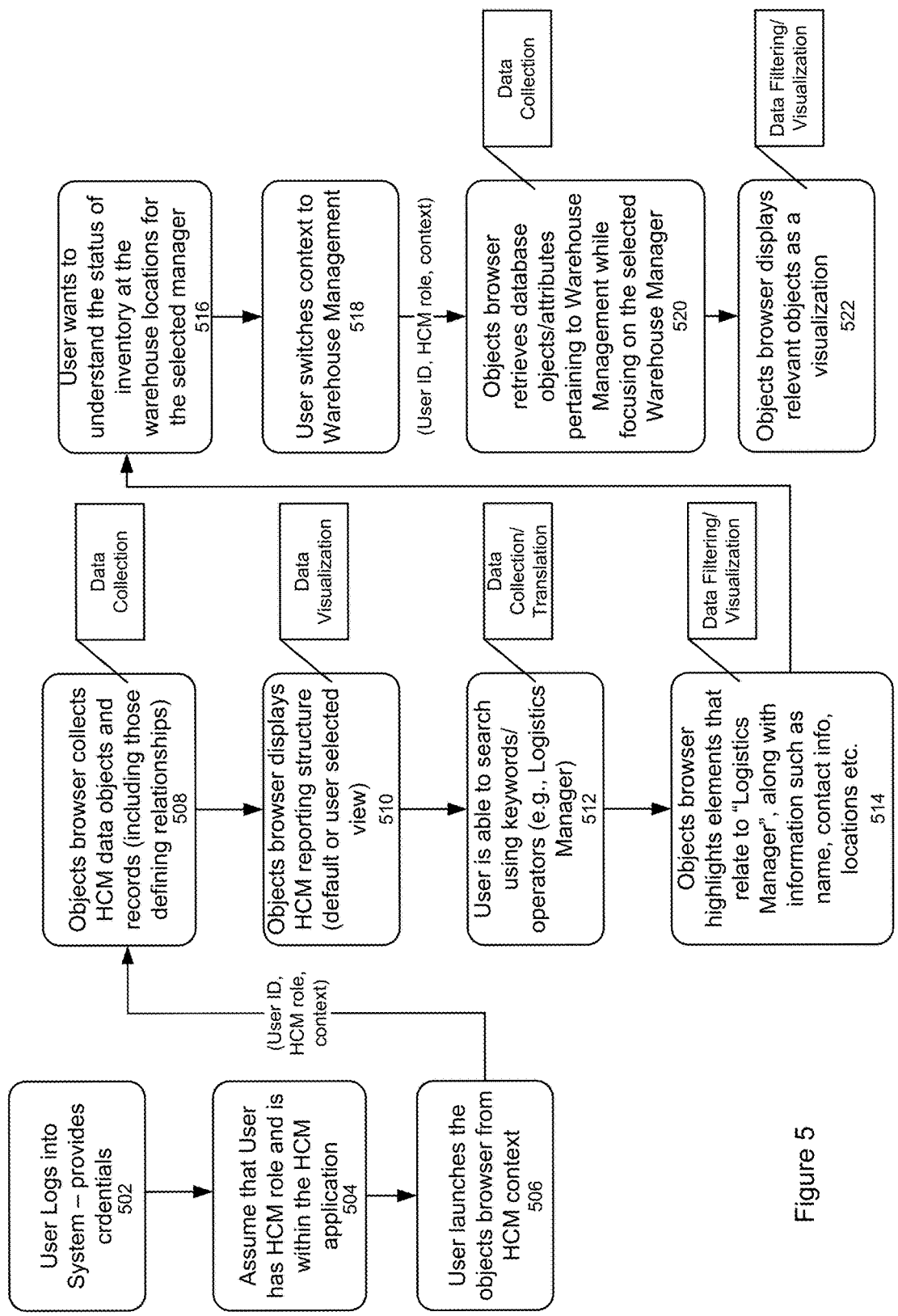
FIG. 5 is a flow chart or flow diagram illustrating a process, method, operation or function for generating an interactive display of various types or categories of organizational data, in accordance with an embodiment of the inventive system and methods.

FIG. 5 is a flow chart or flow diagram illustrating a process, method, operation or function for generating an interactive display of various types or categories of organizational data, in accordance with an embodiment of the inventive system and methods. As shown in the figure, in a typical use case an embodiment of the inventive system may perform or implement the following set of steps or processes:

- 502—user logs into system and/or functional application;
- 504—in this example, the user has a HCM Role (Human Capital Management)—this means they are authorized to view HR data for the organization;
- 506—the inventive Object browser application code (e.g., a single file, or collection of files containing javascript code) is loaded into the browser—it is aware of its context (via flags or variables set in the contents of the page), and reports to the system that it is in the HCM context;
- 508—the server side system will load the relevant data from the datastore via database requests (in the HCM context, this involves retrieving user data and relationships), and organize it into the schema that the client-side object browser understands. Objects are typically serialized into a flat format, and keyed by their GUID (globally unique ID). Likewise, interconnections between objects are replaced by references to the target object's type and GUID;
- 510—the client side object browser receives the object information, including the context, and also (if applicable) any preferences set by the user for their preferred view. The object browser decides which rendering engine to use, and passes that engine the data for display—note that a standard initial or default display may be specified for certain types of data; for example, employee data may initially be presented as an org chart (such as a reporting structure) from which other data sets or views may be accessed;
- 512—user is able to perform a search using keywords or phrases (e.g., for a certain role or title) via a browser-side web form;
- 514—the object browser identifies matching items within the current view (in this case the org chart), and intelligently highlights the appropriate items or item. This could involve changing the appearance of one or several matching elements, adjusting the view to provide focus on the match elements, or changing the selected state of match elements to replicate the functionality of a mouse click or hover;
- 516—the user finds the person they are interested in, including that person's related information (such as their location, work group, current status, employment records, etc.);
- 518—now assume that the user desires to further investigate data that is associated with some aspect of the person; for example, selecting the person's location will inform the system that the user is now interested in switching to the location context from the employee or personnel context (this means that other data associated with the location, but not directly with the person, will be accessed and made available for processing and display);
- 520—note that the object browser initially retrieved the data for the context it started in (in order to save unneeded processing and data transfer operations); now that the user has expressed an interest in location related/associated data, a request to the server triggers the gathering of location related data from the database, and once again, it is filtered based on what the user should be able to see, then packaged into a format that the client side can use; and
- 522—step 510 repeats, with the accessed location related or associated data being presented to the user for their viewing and interaction (note that it may be presented in a default or standard display, such as a geographical map for example.

Note the following aspects or characteristics of the process illustrated in the figure:

Process steps or stages 502-508 represent a typical use case (user provides credentials or other form of identification, user is authorized to access data, user ID, role, and context are used to determine which data elements are accessed (as suggested by the system passing this information to the objects browser);

Process steps or stages 510-514 represent generation of the initial display and the user interaction with it;

Process steps or stages 516-518 represent how the user changes the view or context of the data displayed; typically, this may occur by a user selecting a displayed item, entering a command, etc. (note that the system may again pass the user's credential or other information to the objects browser in order to enable the determine the data objects to be displayed); and Process steps or stages 520-522 represent the second display which is based on the data elements in the "location" context, but which was accessed by selection of a data element in a different context.

Examples of the user interface elements, relationships, and features generated by an embodiment of the inventive system and methods are illustrated in FIGS. 6(*a*) through 6(*i*). The figures will be described in greater detail after the following description of the data sources and data processing capabilities that may provide input data to an implementation of an embodiment of the invention (i.e., these are potential sources of the data represented by element 403 of FIG. 4). Knowing the data sources and the types of data processing that may be performed will assist in understanding the context and type of data that may be available, and will make the value and utility of the inventive user interface displays more apparent.

In some embodiments, the invention may be implemented in the context of a multi-tenant, "cloud" based environment (such as a multi-tenant business data processing platform), typically used to develop and provide web services and business applications for end users. This exemplary implementation environment will be described with reference to FIGS. 1-3. Note that embodiments of the invention may also be implemented in the context of other computing or operational environments or systems, such as for an individual business data processing system, a private network used with a plurality of client terminals, a remote or on-site data processing system, another form of client-server architecture, etc.

Modern computer networks incorporate layers of virtualization so that physically remote computers and computer components can be allocated to a particular task and then reallocated when the task is done. Users sometimes speak in terms of computing "clouds" because of the way groups of computers and computing components can form and split responsive to user demand, and because users often never see the computing hardware that ultimately provides the computing services. More recently, different types of computing clouds and cloud services have begun emerging.

For the purposes of this description, cloud services may be divided broadly into "low level" services and "high level" services. Low level cloud services (sometimes called "raw" or "commodity" services) typically provide little more than virtual versions of a newly purchased physical computer system: virtual disk storage space, virtual processing power, an operating system, and perhaps a database such as an RDBMS. In contrast, high or higher level cloud services typically focus on one or more well-defined end user applications, such as business oriented applications. Some high level cloud services provide an ability to customize and/or extend the functionality of one or more of the end user applications they provide; however, high level cloud services typically do not provide direct access to low level computing functions.

The ability of business users to access crucial business information has been greatly enhanced by the proliferation of IP-based networking together with advances in object oriented Web-based programming and browser technology. Using these advances, systems have been developed that permit web-based access to business information systems, thereby allowing a user with a browser and an Internet or intranet connection to view, enter, or modify business information. For example, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions.

In a related development, substantial efforts have also been directed to integrated Customer Relationship Management (CRM) systems, with a view toward obtaining a better understanding of customers, enhancing service to existing customers, and acquiring new and profitable customers. By way of example, the capabilities or modules of a CRM system can include (but are not required to include, nor limited to only including): sales force automation (SFA), marketing automation (including campaign automation), contact list, call center support, returns management authorization (RMA), loyalty program support, and web-based customer support, as well as reporting and analysis capabilities relating to these functions. With differing levels of overlap with ERP/CRM initiatives and with each other, efforts have also been directed toward development of increasingly integrated partner and vendor management systems, as well as web store/eCommerce, product lifecycle management (PLM), and supply chain management (SCM) functionality.

FIG. 1 is a diagram illustrating a system 100, including an integrated business system 102 and an enterprise network 104 in which an embodiment of the invention may be implemented. Enterprise network 104 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection. For simplicity and clarity of explanation, the enterprise network 104 is represented by an on-site local area network 106 to which a plurality of personal computers 108 are connected, each generally dedicated to a particular end user (although such dedication is not required), along with an exemplary remote user computer 110 that can be, for example, a laptop computer or tablet computer of a traveling employee having internet access through a hotel, coffee shop, a public Wi-Fi access point, or other internet access method. The end users associated with computers 108 and 110 may also (or instead) possess an internet-enabled smartphone or other electronic device (such as a PDA) having wireless internet access or other synchronization capabilities. Users of the enterprise network 104 interface with the integrated business system 102 across the Internet 112 or another suitable communications network or combination of networks.

Integrated business system 102, which may be hosted by a dedicated third party, may include an integrated business server 114 and a web interface server 116, coupled as shown in FIG. 1. It is to be appreciated that either or both of the integrated business server 114 and the web interface server 116 may be implemented on one or more different hardware systems and components, even though represented as singular units in FIG. 1. In one embodiment, integrated business server 114 comprises an ERP module 118 and further comprises a CRM module 120. In many cases, it will be desirable for the ERP module 118 to share methods, libraries, databases, subroutines, variables, etc., with CRM module 120, and indeed ERP module 118 may be intertwined with CRM module 120 into an integrated Business Data Processing Platform (which may be single tenant, but is typically multi-tenant).

The ERP module 118 may include, but is not limited to, a finance and accounting module, an order processing module, a time and billing module, an inventory management and distribution module, an employee management and payroll module, a calendaring and collaboration module, a reporting and analysis module, and other ERP-related modules. The CRM module 120 may include, but is not limited to, a sales force automation (SFA) module, a marketing automation module, a contact list module (not shown), a call center support module, a web-based customer support module, a reporting and analysis module, and other CRM-related modules. The integrated business server 114 (or multi-tenant data processing platform) further may provide other business functionalities including a web store/eCommerce module 122, a partner and vendor management module 124, and an integrated reporting module 130. An SCM (supply chain management) module 126 and PLM (product lifecycle management) module 128 may also be provided. Web interface server 116 is configured and adapted to interface with the integrated business server 114 to provide one or more web-based user interfaces to end users of the enterprise network 104.

The integrated business system shown in FIG. 1 may be hosted on a distributed computing system made up of at least one, but likely multiple, "servers." A server is a physical computer dedicated to providing data storage and to hosting or providing an execution environment for one or more software services/applications intended to serve the needs of the users of other computers in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service that a server offers it could be referred to as a database server, file server, mail server, print server, web server, etc. A web server is a most often a combination of hardware and the software that helps deliver content, commonly by hosting a website, to client web browsers that access the web server via the Internet.

Figure 2:
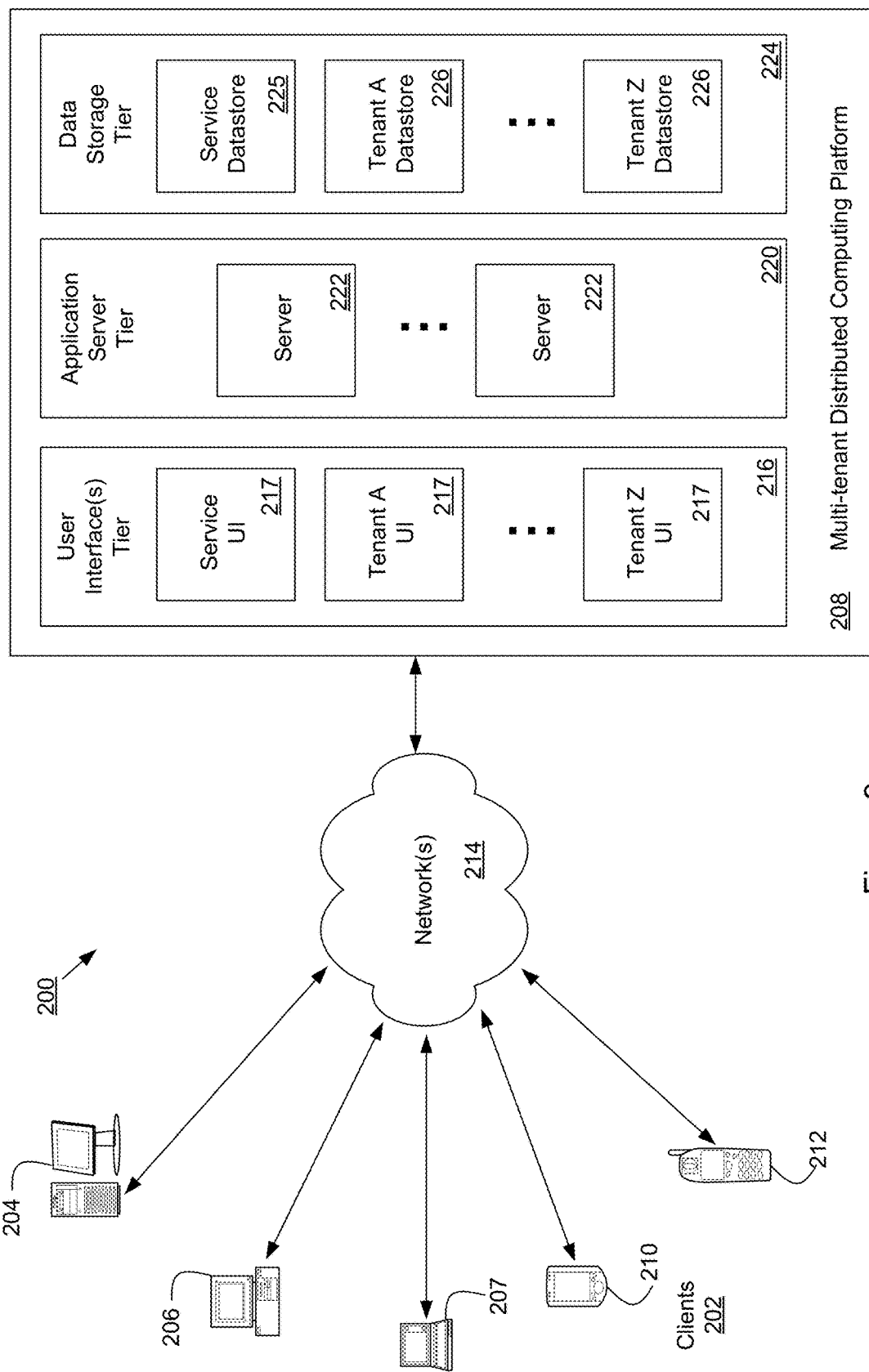
FIG. 2 is a diagram illustrating elements or components of an example operating environment in which an embodiment of the invention may be implemented.

FIG. 2 is a diagram illustrating elements or components of an example operating environment 200 in which an embodiment of the invention may be implemented. As shown, a variety of clients 202 incorporating and/or incorporated into a variety of computing devices may communicate with a distributed computing service/platform 208 through one or more networks 214. For example, a client may incorporate and/or be incorporated into a client application (e.g., software) implemented at least in part by one or more of the computing devices. Examples of suitable computing devices include personal computers, server computers 204, desktop computers 206, laptop computers 207, notebook computers, tablet computers or personal digital assistants (PDAs) 210, smart phones 212, cell phones, and consumer electronic devices incorporating one or more computing device components, such as one or more electronic processors, microprocessors, central processing units (CPU), or controllers. Examples of suitable networks 214 include networks utilizing wired and/or wireless communication technologies and networks operating in accordance with any suitable networking and/or communication protocol (e.g., the Internet).

The distributed computing service/platform (which may also be referred to as a multi-tenant business data processing platform) 208 may include multiple processing tiers, including a user interface tier 216, an application server tier 220, and a data storage tier 224. The user interface tier 216 may maintain multiple user interfaces 217, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 224 may include one or more data stores, which may include a Service Data store 225 and one or more Tenant Data stores 226.

Each tenant data store 226 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 208 may be multi-tenant and service platform 208 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 222 that are part of the platform's Application Server Tier 220.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. In addition to ERP and CRM functions, a business information system/platform (such as element 208 of FIG. 2) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 222 that are part of the platform's Application Server Tier 220.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 208 of FIG. 2).

As noted with regards to FIG. 1, the integrated business system shown in FIG. 2 may be hosted on a distributed computing system made up of at least one, but typically multiple, "servers." A server is a physical computer dedicated to providing data storage and to hosting or providing an execution environment for one or more software services/applications intended to serve the needs of the users of other computers in data communication with the server, for instance via a public network such as the Internet or a private "intranet" network. The server, and the services it provides, may be referred to as the "host" and the remote computers and the software applications running on the remote computers may be referred to as the "clients."

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business related data that is resident on the platform. The extension may be developed by the tenant or by a 3rd party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

Figure 3:
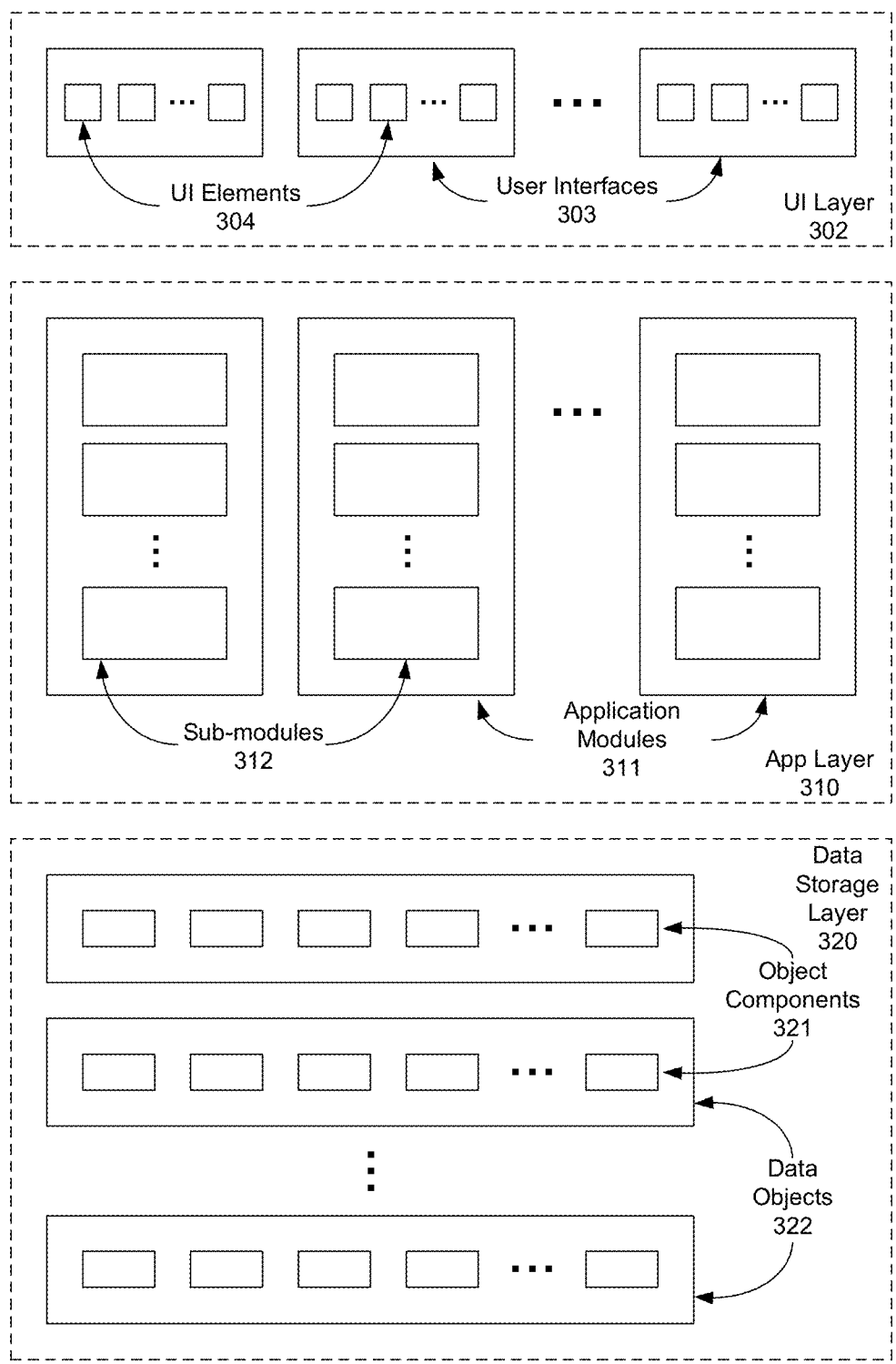
FIG. 3 is a diagram illustrating additional details of the elements or components of the multi-tenant distributed computing service platform of FIG. 2, in which an embodiment of the invention may be implemented.

FIG. 3 is a diagram illustrating additional details of the elements or components of the multi-tenant distributed computing service platform of FIG. 2, in which an embodiment of the invention may be implemented. The software architecture depicted in FIG. 2 represents an example of a complex software system to which an embodiment of the invention may be applied. In general, an embodiment of the invention may be implemented using a set of software instructions that are designed to be executed by a suitably programmed processing element (such as a CPU, microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 3 is a diagram illustrating additional details of the elements or components 300 of the multi-tenant distributed computing service platform of FIG. 2, in which an embodiment of the invention may be implemented. The example architecture includes a user interface layer or tier 302 having one or more user interfaces 303. Examples of such user interfaces include graphical user interfaces and application programming interfaces (APIs). Each user interface may include one or more interface elements 304. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols. As described herein, embodiments of the invention provide a method for configuring aspects of a user interface (such as the data entry fields of a form) by specifying one or more user interface elements to present to a specified user.

The application layer 310 may include one or more application modules 311, each having one or more sub-modules 312. Each application module 311 or sub-module 312 may correspond to a particular function, method, process, view, or operation that is implemented by the module or sub-module (e.g., a function or process related to manipulating, filtering, weighting, or other entity modification functionality of the platform, or to processing or evaluating ERP, CRM, eCommerce, or financial data for a business, for example). Such function, method, process, or operation may also include those used to implement one or more aspects of the inventive system and methods, such as for:

Determining the data objects that a specific user is authorized to access and view as part of the inventive visualization and navigation functions. This would typically involve the server's access control system to determine what types of data are allowed for the current user (based on their access level, role, task, department, authorizations, etc.);

Generating the visualization, including applying applicable rules, criteria, or conditions to the accessed data prior to generating the visualization;

Deciding the appropriate view, style, and focus level of the data, prior to visualization, based on the user's current context and preferences;

Responding to instructions or actions of the user to modify the visualization, such as by applying a specific operation (e.g., zoom, rotate, change focus, etc.) to the data used to generate the visualization; and Applying data mining or analysis techniques (machine learning, statistical analysis, etc.) in order to identify or "discover" relationships, associations, or correlations between the data objects.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 222 of FIG. 2) may include each application module. Alternatively, different application servers may include different sets of application modules. Such sets may be disjoint or overlapping.

The data storage layer 320 may include one or more data objects 322 each having one or more data object components 321, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 1-3 are not intended to be limiting examples. Alternatively, or in addition, computing environments in which an embodiment of the invention may be implemented include any suitable system that permits users to provide data to, and access, process, and utilize data stored in a data storage element (e.g., a database or other form of data store) that can be accessed remotely over a network. Further example environments in which an embodiment of the invention may be implemented include devices (including mobile devices), software applications, systems, apparatuses, networks, or other configurable components that may be used by multiple users for data entry, data processing, application execution, data review, etc. and which have user interfaces or user interface components that can be configured to present an interface to a user.

Although further examples below may reference the example computing environment depicted in FIGS. 1-3, it will be apparent to one of skill in the art that the examples may be adapted for alternate computing devices, systems, apparatuses, processes, and environments. Note that an embodiment of the inventive methods may be implemented in the form of an application, a sub-routine that is part of a larger application, a "plug-in", an extension to the functionality of a data processing system or platform, or any other suitable form.

As mentioned, the form or structure of the underlying database or data store that contains the data used to generate the inventive interfaces may introduce one or more of its own benefits, and thereby increase the utility of the inventive system and methods. This is because the use of a single integrated data storage for data from multiple applications may permit otherwise undiscoverable relationships, associations, or correlations to be determined (e.g., identifying a predictable variation in one parameter as a result of a change in another parameter that is associated with a different application). This enables the inventive interfaces to provide a user with more information than they might otherwise have access to and as one result, to identify or "discover" relationships and interactions between entities that would otherwise be unlikely to be recognized. By introducing this visualization engine to an existing system that already holds much, or all, of a company's important business information, there are far fewer barriers to creating a system that can reach into all corners of the relevant data, and assist in identifying the relationships that are important for any given decision.

Thus, implementing an embodiment of the inventive data visualization and navigation system and methods in conjunction with a data store or database that represents a unified datastore for a wide variety of types of data (including, but not limited to (or requiring) ERP, CRM, HR (or HCM), eCommerce, Admin, Facilities, etc.) provides the benefit of being able to seamlessly and efficiently navigate between different contexts and sets of data elements. The system inherently has high-speed access to not only the data of a company, but also has knowledge about what that data represents and how it may be related to other data. This allows for a much more meaningful and useful visualization to be built from the data. Being cloud based (as is the multi-tenant platform described herein) also infers an advantage because the links between data are already in a form that the object browser will natively understand and be able to process and display. In contrast, note that conventional data visualization applications typically keep some data on the internet and some in custom fields within a specific local or remote application; this makes the rich interlinking of data much more difficult, if not impossible to achieve.

From one perspective, if a data record of an object/entity (such as an employee, an item for sale, a location, a work team, a project, a department, etc.) is viewed as including a set of data fields, then each application (or context) accesses and manipulates a subset of those fields. If two different applications or contexts (such as ERP and CRM) share use of at least one data field, then that field can serve as an entry point or bridge to transition from one application into another application (or from one context to another), which can then serve as the entry point into other sets of data fields or applications (for example, HR data→display of org chart→selection of specific person→to HR context data for that person→selection of specific HR context data (for example, work location)→other data associated with the selected location data→selection of specific location context data→ . . . ). Note that the common data element or object between the two contexts or functional applications (such as HR and Warehouse/Location/Inventory) establishes a linkage between applications, contexts, or sets of data fields, which can then be navigated and "explored" using the inventive UI.

From another perspective, an object or entity has an associated data record containing a plurality of data fields. When a specific application or context is being used (such as HR or ERP), the objects or entities may be displayed in a default visualization for that context (such as a tree structure or a central node with "satellites"). When an object or entity is selected from that view, the data fields associated with that object or entity may be examined. If the value in one of the fields is then selected, the objects browser effectively treats that field as an object and generates a visualization of the data associated with that object. This permits a user to navigate between different data sets and relationships, such as between a person, the person's role, others having that role, the location of a specific person having that role, other activities at that location, etc.

Note also that the standard or default view (as discussed with reference to step or stage 510 of FIG. 5) may be determined by any suitable manner, including but not limited to being specified by the user, being based on the type or context of the data being displayed (such as using a tree structure for employee data or a network of nodes that may be arranged hierarchically, an "orbital" model for data that features a central focus and surrounding information, etc.), by reference to a default set of rules or conditions, etc.

FIGS. 6(a) through 6(i) are diagrams illustrating data visualizations generated using an embodiment of the invention. The specific use cases and types of data utilized to generate the visualizations are described in greater detail in the following discussion. As will be described with reference to the figures, the inventive system and methods may be used to generate a data visualization based on one or more of a user's role or authorization, the context in which the user is accessing the data, and the application of one or more specific rules or criteria, and then permit the user to interact with the data by applying one or more functions or operations so as to modify the display.

In some embodiments, these functions or operations may include, but are not limited to (or required to include):

Zoom in—adjust the view to see a small part of the whole more clearly;

Zoom out—adjust the view to see the overall structure more clearly;

Change current focus—re-prioritize the system's focus on a new entity;

Change current context—switch to a different view to display a different type of information;

Change current View Type—view the same data in a different style of view;

Display more information—view ancillary information for a given entity;

Highlight directly related items—clearly show other items in the current view that are directly related;

Highlight interconnections—clearly show an indication of the current item's interconnections to other items; and Show all directly related items—create a new view that shows all the items directly related to the current focus (i.e., if the current focus is a user, show their location, department, training, blog posts, skills, time-off requests, equipment, team members, etc.).

Application of these controls permits a user to examine and interact with varying levels and types of data that are related, but may not be arranged in a hierarchical manner.

There is a tendency in many existing systems to arrange data into strict hierarchical trees. A standard organizational chart, showing managers and reports is a classic example of this. An organizational chart showing the head office, satellite offices, sales associates, etc. would also tend to follow the same structure. These node trees are well understood and documented in the computer algorithm world, and so there is a tendency to try and put data in them for ease of storage and consumption. However, they are rarely representative of how the real world actually works. For the sake of offering more useful business intelligence, embodiments of the inventive system make a model that fits the data, instead of making the data fit a desired model. This provides a visualization of the relationships that exist between the different entities in the organization, and enables decisions to be based on a more realistic understanding of the operation and interrelationships within an organization.

Figure 6A:
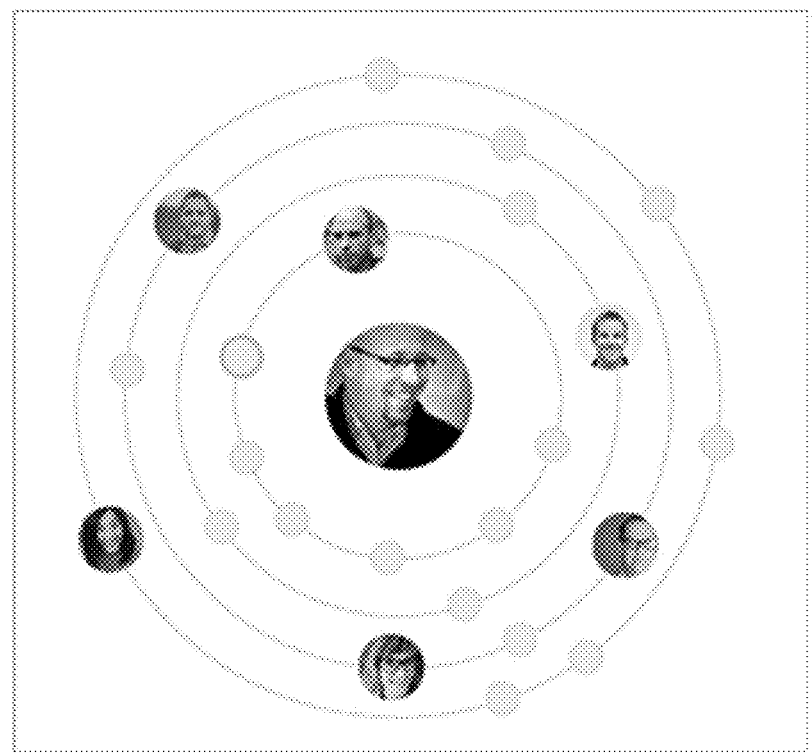
FIGS. 6(a) through 6(i) are diagrams illustrating data visualizations generated using an embodiment of the invention. The specific use cases and types of data utilized to generate the visualizations are described in greater detail in the application.
Figure 6B:
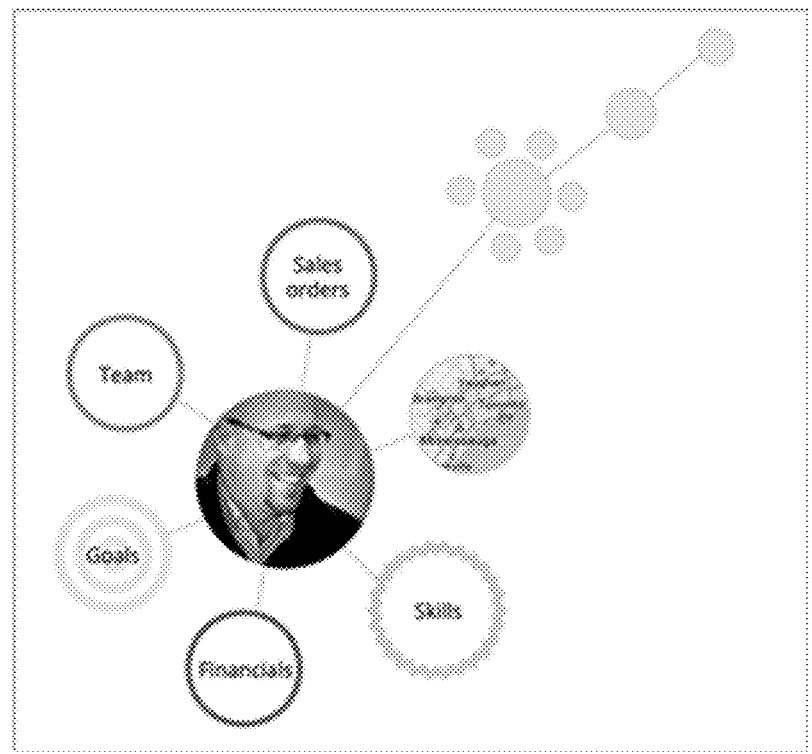
Figure 6C:
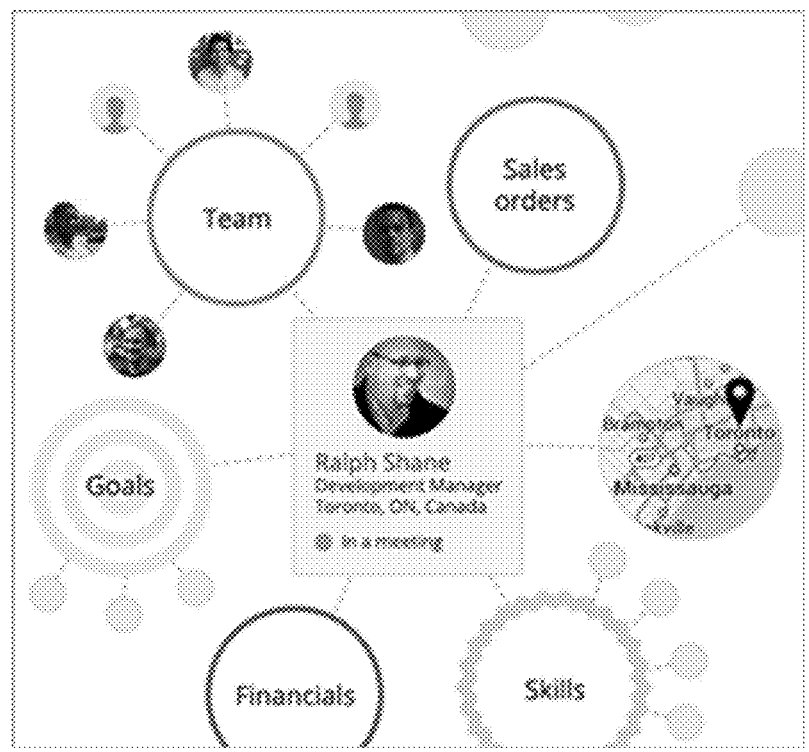
Figure 6D:
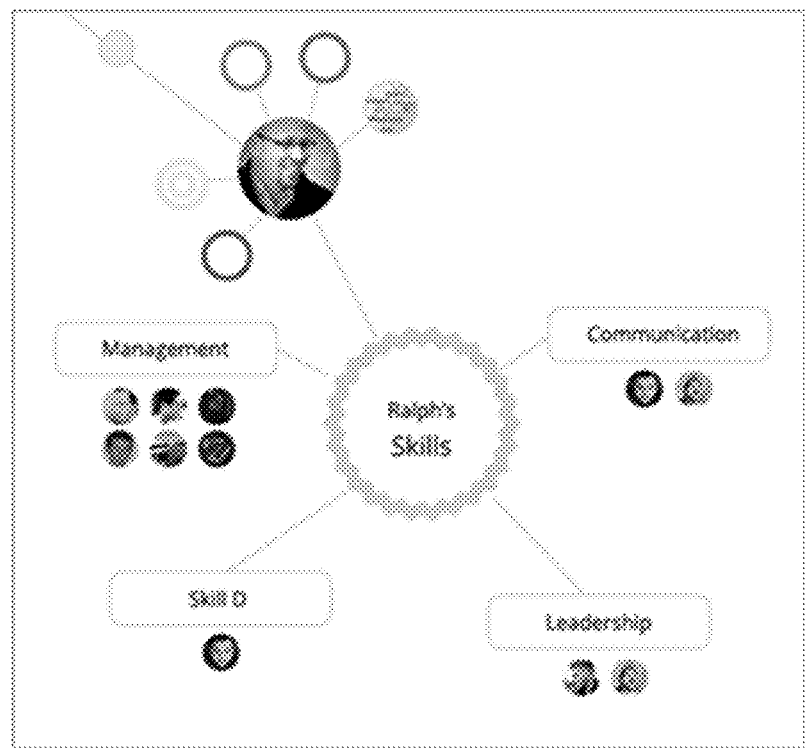
Figure 6E:
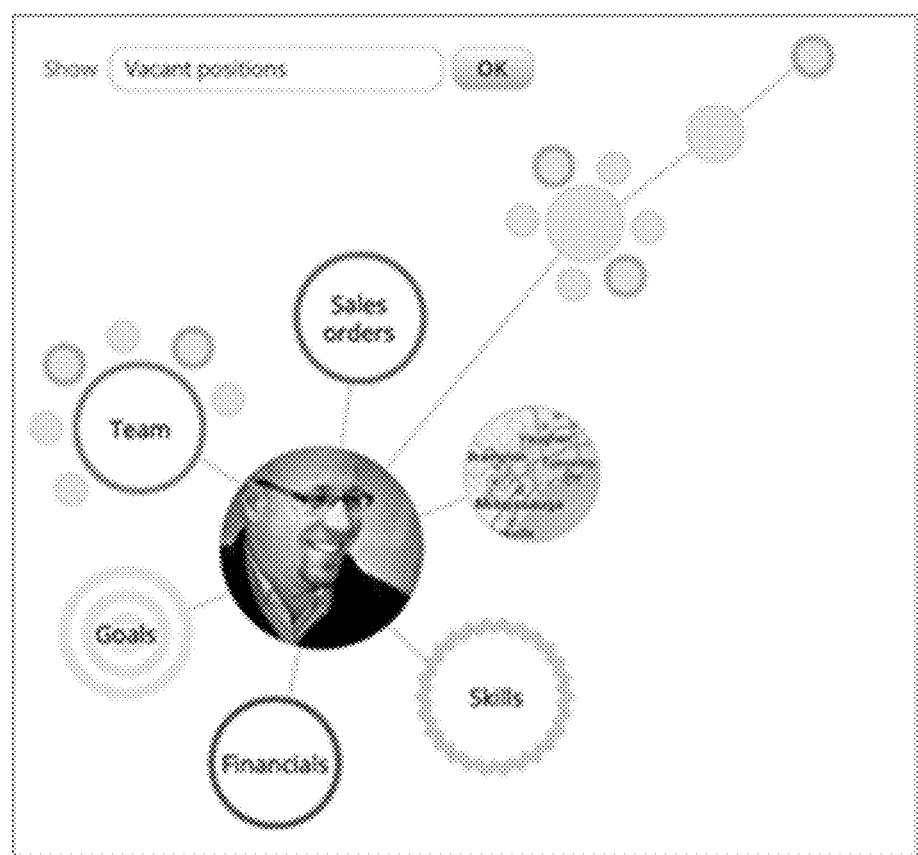
Figure 6F:
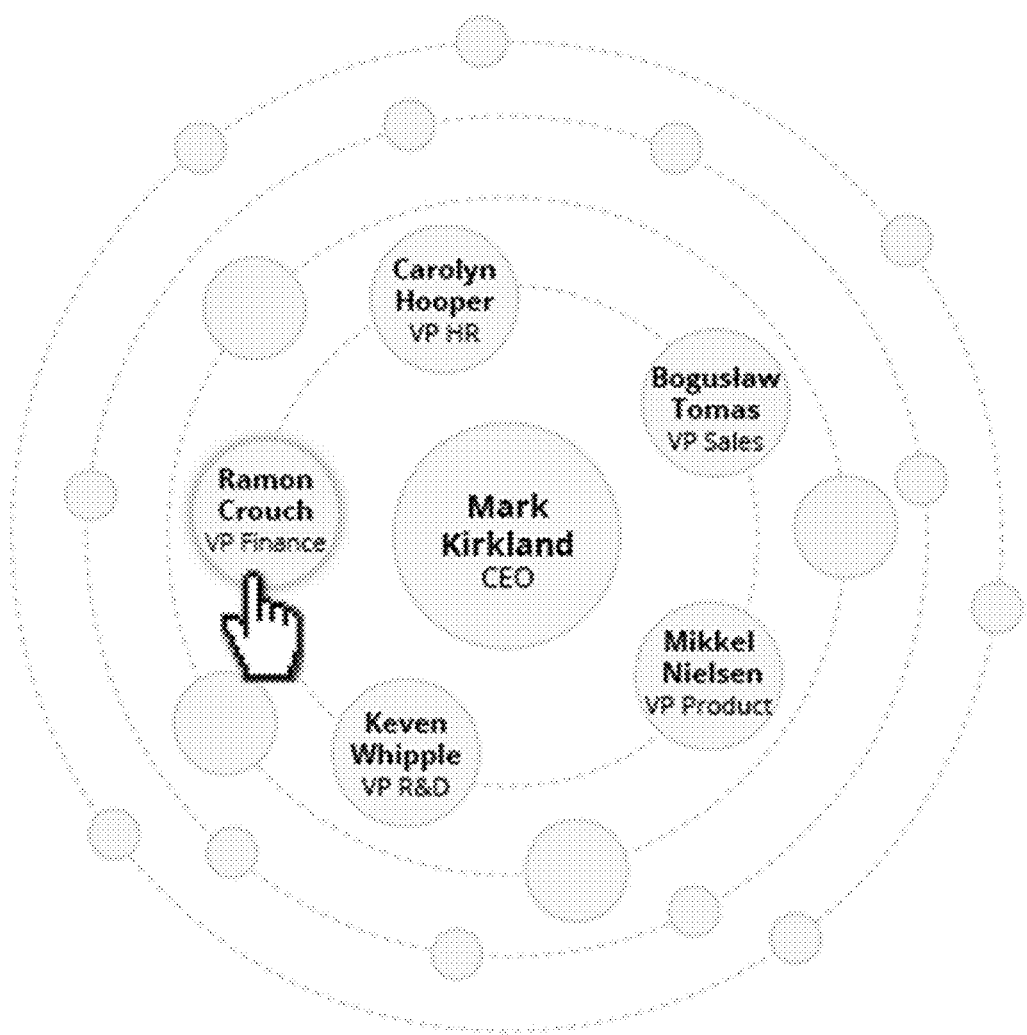
Figure 6G:
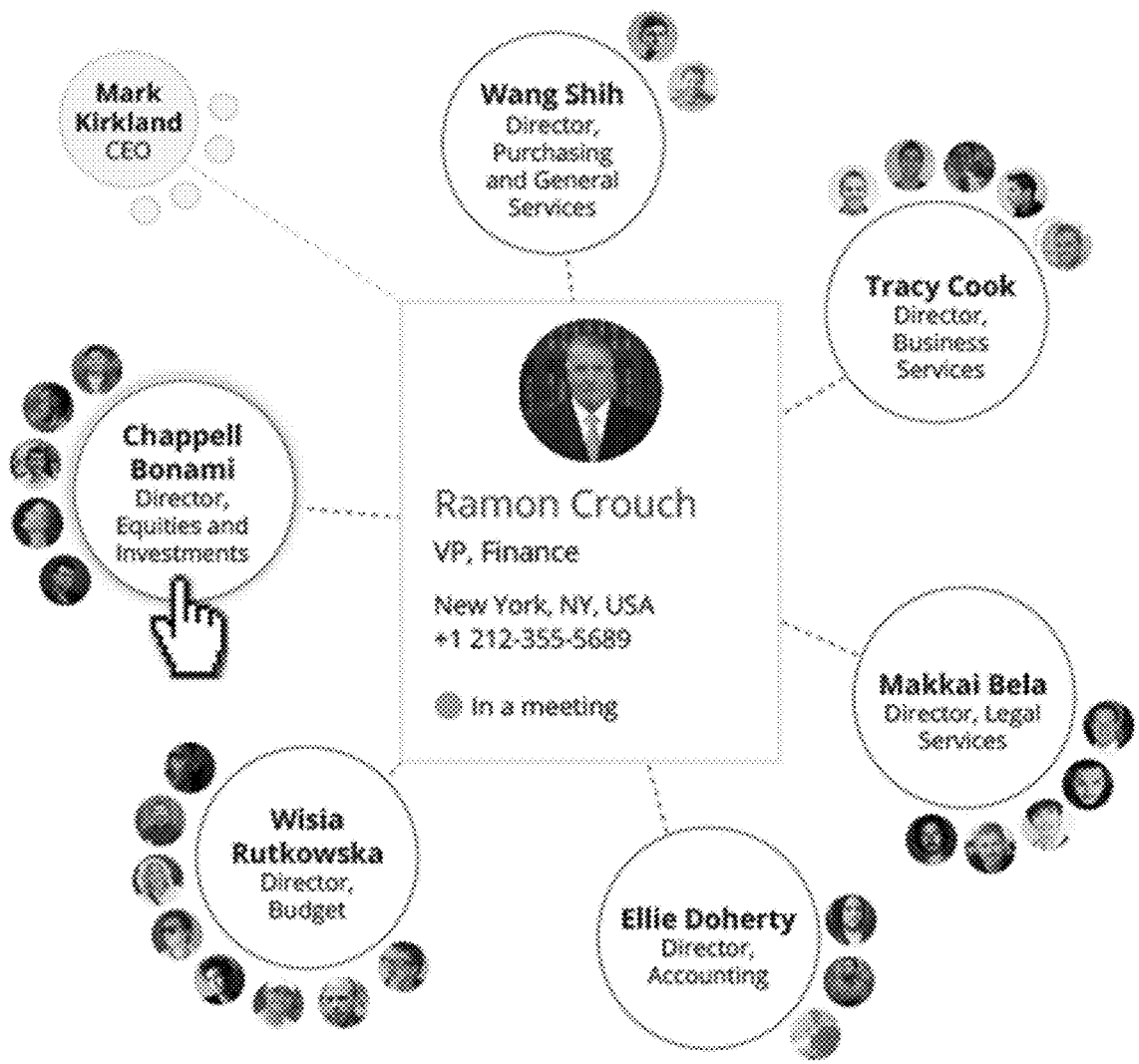
Figure 6H:
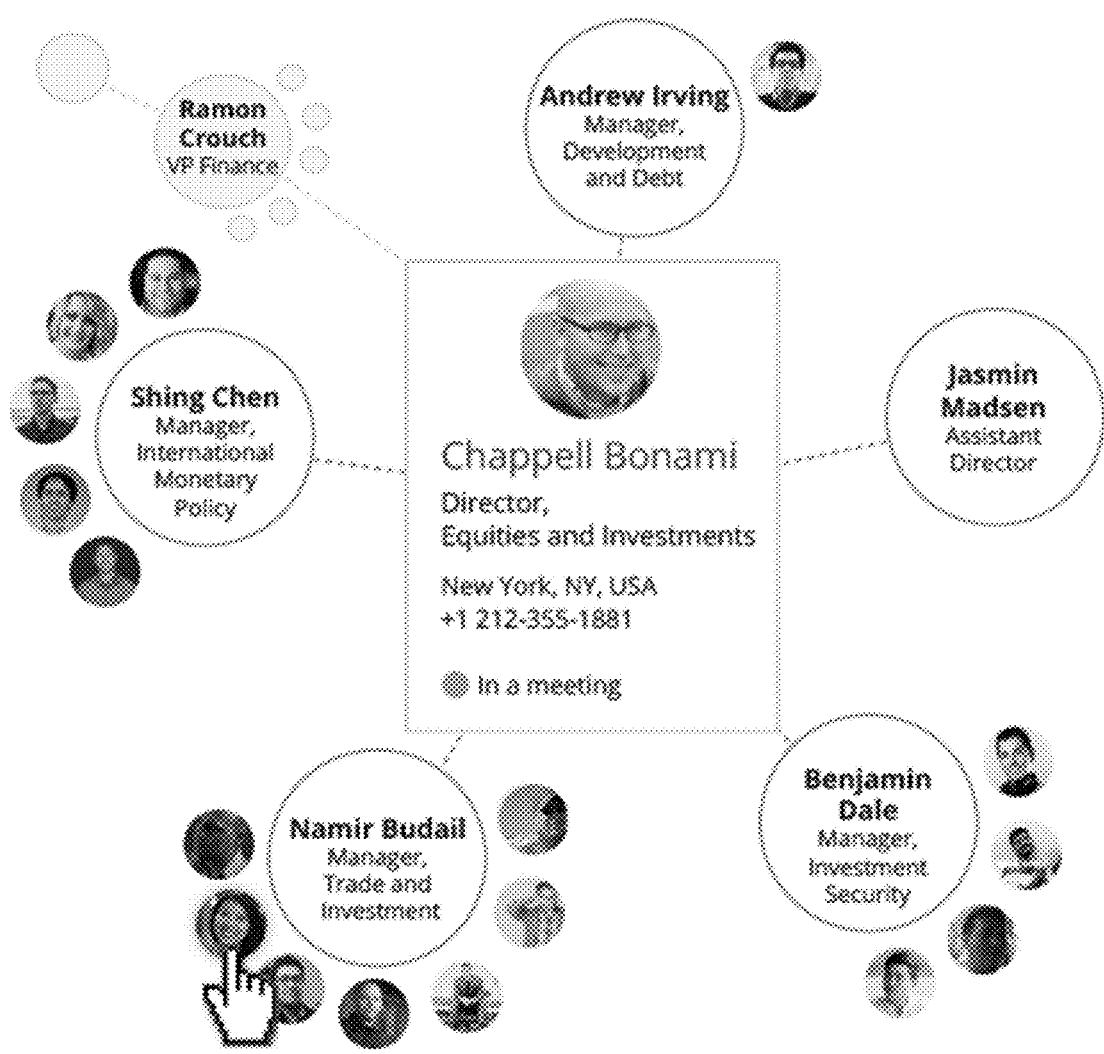
Figure 6I:

As noted, embodiments of the inventive data processing and presentation system and methods provide one or more of the following functional capabilities, each of which alone or in combination with other of the capabilities, enable a user to better understand how entities or events within an organization are related, but also to "discover" new and important relationships, associations, and correlations:

(1) Visualize & Navigate—the ability to visualize and navigate or browse between different types of objects, based on how they are related to one-another (as suggested by FIG. 6(a));

(2) Dynamic Focus—the ability to change "focus" from one object to another during the navigation. The visualization retains a central focus while visualizing related objects in the background as another object (as suggested by FIG. 6(b));

(3) Zoom—the ability to zoom in by "double click" or other action (using page controls, magnifying glass control, etc.) to see additional details (as suggested by FIG. 6(c));

(4) Dynamic & Unique—the ability to focus on specific elements or relationships of the object (e.g., the budget or sales or skills of an employee, as suggested by FIG. 6(d)). This is a unique capability of the inventive system since it incorporates a unified object and data model allowing information to either be included in the original request, or retrieved dynamically via a REST API, as the user navigates the chart; and (5) Heat Mapping—the ability to locate objects visually through searching, and highlight areas of interest in a heat map like display/concept, as suggested by FIG. 6(e). As an example: highlight all vacant positions (based on HCM/HR data) or individuals with the highest # of sales orders (based on CRM data).

In order to better understand the process of generating the inventive interfaces and the advantages that they can provide to users, several examples of use cases that involve embodiments of the inventive system and methods will be described. Note that the combination of an integrated data store and the display and navigation between perspectives provided by embodiments of the invention, enables users to identify or discover relationships, associations, and correlations between data objects contained in the data store.

Further, these data objects may represent employees, roles, categories of events (such as sales), operational state information (such as inventory), entities or processes within an organization. This permits decision makers to learn new things about how the organization operates and functions, and may lead to improvements designed to facilitate better organizational operations.

Example Use Cases and Displays of the Inventive Interactive User Interface

1: Finding Talent/Experts in the Organization (as Suggested by FIG. 6(d))

Jason, a project manager, is looking for a domain expert in the area of supply chain management to include that person as part of a new operations optimizations initiative within the company;

He uses the object browser to find individuals with Supply Chain knowledge or experience. He can see several such individuals in the Professional Services operations of the company. Jason narrows his search down by highlighting individuals who are "currently available", have a "min 5 years' experience" and are high "performers"—since Jason's company has set up the system to track employee skills, achievements and current tasks, the required data exists within the database. Since the data types are not predefined, but are almost completely configurable by each customer, search metrics should be just as customizable. Predefined search patterns are built by the user or system administrator, and made available inside the general search dialog. These can then be combined in various ways at the time of the search to produce the desired result;

The browser is able to provide a heat-map of such individuals within the professional services part of the overall company. Jason is able to drill down into select individuals (for example Ralph, as suggested by FIG. 6(d)) to understand their skills, experience, reporting structure and contact information. Important aspects of this example include:

Visualization of different objects (people, competencies, relationships) and heat-maps;

Drill down/zoom in on objects in org chart; and

Pulling data from HCM, PSA modules dynamically (and in real-time/pseudo real-time).

2: Review Key Metrics for an Employee (as Suggested by FIG. 6(e))

An executive (Carla) is travelling to Toronto and is scheduled to meet with Ralph (an accomplished employee who Carla wants to engage to run a new operation);

Carla uses the inventive object browser to locate Ralph and get a quick summary of his key initiatives and their progress/success. She can understand how Ralph has generated new business recently in terms of Sales Orders. She is also able to see his department's financial details and budgets. Finally, she looks at the team Ralph manages in order to understand not only how his team contributes to the business, but also understand the impact of moving Ralph into a new role. Important aspects of this example include:

Key information available at fingertips; multiple objects, real-time information;

Ease of usability, simple visualization; and

Pulling data from HCM, CRM, Financials dynamically without running specific reports.

3: Warehouse Management
- Jason is an operations manager for a large department store chain. He is reviewing inventory reports and trying to figure out if there are any areas of concern;
- Jason uses the inventive objects browser to identify logistics centers that have relatively low inventory (for example, by accessing and displaying a set of logistic centers and then searching for those that have associated inventory data that satisfies a rule, condition, or threshold). A heat map display may be used to highlight areas that might benefit from further investigation, including the "Atlanta" warehouse;
- Jason then selects or zooms into an element representing the Atlanta warehouse to examine data associated with that warehouse and find product categories that have a "red flag", and then the products within those categories. As Jason zooms in, the browser provides more and more information and details, at an adjustable level of granularity.
- Important aspects of this example include:
  - Re-usability of objects; the same objects browser is utilized in a completely different context. This use of the objects browser provides competitive and technology advantages in business;
  - Ease of usability: simple visualization. Enables user to view delivery and inventory statistics for inventory at the warehouse in a visual way; and
  - Pulling data from SCM and Warehouse Management dynamically without running multiple specific reports.

4: Understand Reporting Structure (as Suggested by FIGS. 6(f) Through 6(i))
- Erin is an employee and needs to speak with someone in the Finance/Accounting area of the firm regarding certain policies (e.g., equities and investments). She does not understand who she should be speaking to or the structure of the Finance/Accounting organization;
- She opens the organization browser and locates the Finance department. She can now see the department heads and who reports to who, along with their respective jobs, locations and contact information;
- She is able to navigate the structure to find one or more financial analysts who manage policies regarding equities and investments; Important aspects of this example include:
  - Visualization reporting relationships between employees/positions;
  - Navigate and understand the org structure; and
  - Specialized views focusing on relevant objects (positions, jobs, people, contact information).

Embodiments of the invention may be referred to as an "object browser" because of the general purpose nature of the data being viewed. The "objects" that are being browsed may represent a wide variety of real objects or entities in the organization (employees, locations, equipment, etc.), virtual objects (training courses, reference articles, videos, etc.), and non-corporeal entities (skills, knowledge, etc.). In the context of the invention, each of these objects may be considered a node, and each has interconnections to other objects in the system (e.g., a location has many employees, an employee has many team members, and many skills, etc.). Each object type will also have one or more contexts that it should be displayed in (such as ERP, HR, CRM, etc.), as well as an understanding of what related information is to be displayed at different focus levels.

As recognized by the inventors, to properly display data of this type it is necessary to use a versatile schema for representing arbitrary objects and interconnections, visualization and graph optimization methods to best display the dataset (in whole or in part, and in a 2-dimensional or pseudo 3-dimensional space), and useful search and filtering methods for quickly reaching the desired data.

Note that the variety and arbitrary nature of the types of data that such a system will deal with means that the system needs to be able to provide users with a variety of ways of representing and visualizing the data in order to better understand it. This means that the inventive data visualization and navigation tool needs to be capable of understanding a set of rules on how to display an object, and then use those rules to display employees or other objects, with a similar set of rules being adapted to show outside contractors or employees customer contacts, for example.

Embodiments of the inventive system and methods may employ various data processing and analysis techniques to generate displays and user interfaces that may assist a user to find information of value, to be made aware of relationships of interest, and in general, to gain a greater understanding of how various units or entities within an organization relate to one another. These could include tracking how relationships change over time, highlighting nodes with the greatest number of interconnections, or the highest ratio of one type of connection to another. These features or capabilities may enable the user to form plans for and better execute business operations by easily determining the best performers, or zero in on assets that produce the highest Return on Investment, understand the impact of a change or decision made with regards to one entity on another entity (tracked over time), and more readily find and understand all data related to an entity, even if generated by a different application or business function.

An example of such a system and set of data processing methods is disclosed in U.S. patent application Ser. No. 15/134,099, entitled "System and Methods for Processing Information Regarding Relationships and Interactions to Assist in Making Organizational Decisions", filed Apr. 20, 2016, assigned to the assignee of the present application, and the entire contents of which is hereby incorporated by reference.

As an example, conventional ERP, CRM, or HR systems traditionally maintain large amounts of data about an organization, its employees, its customers, its financial and operational aspects, etc. Users rely on conventional/typical search and report mechanisms to find and understand information. However, there is no easy and effective way to get a holistic view of the organization, the objects within the organization, and how these objects interact with or relate to one another. Embodiments of the inventive system and methods address these limitations by providing one or more of the following benefits:
- Both a high level overview and detailed information about the organization, without reloading pages and without navigating away from the main context;
- Embodiments of the invention put information at the fingertips of the user. The inventive object browser is a powerful tool that not only visualizes information, but also helps a user to find relevant information more quickly, along with capabilities to drill deeper into the presented information without ever navigating away from the page/browser;
- Typical org charts tend to focus on hierarchical relationships, such as employee hierarchies, and combine that with other HR elements (such as an employee's job/locations/skills, etc.) within the org chart. These types of visualizations are constrained by the fact that objects must be in a hierarchical relationship to be visualized. There are no conventional solutions that are versatile or generic enough to visualize any and all relationships between objects, and not just hierarchical reporting relationships;

As understood by the inventors, the concept of "zoom in" as described with reference to the invention (which enables a user to get additional information), or the dynamic focus feature, have not previously been applied in the context of ERP or HR systems;

Conventional tools/solutions may permit some degree of visualizing organizational relationships and hierarchies, but the concept of being able to navigate multiple objects, drill down, zoom in for additional information, find/locate areas of interest with heat maps and to dynamically switch focus does not exist in a single conventional solution;

In the context of a business data processing platform (such as one hosting and processing ERP, CRM, HR, financial data, etc.), the inventive concepts can be applied across multiple product lines and data types. The inventive object browser is not limited to a single type of object/entity, but can be used to visualize and investigate objects across different data processing or business modules or applications. For example, users may navigate from an HR structure/object such as a manager, to his/her direct reports, to the accounts managed by one of the employees (CRM data), to recent sales orders for that account (CRM/ERP data), to the financial aspects of that account (receivables/payables etc.); this retrieval and investigation of real-time data may be accomplished through visual browsing and not the more complicated and inefficient process of navigating through complex menus and pages; and Organizations typically cannot bring together multiple data types from different business processes (CRM, HCM, Financials, ERP, PSA); typically, the different data types reside in different databases, or use different data models/schema and/or different applications. However, the inventive system is able to bring together these data elements (as it may be implemented in the context of a multi-tenant business data processing platform that utilizes a common database and operational principles for multiple business functions) and apply appropriate data visualization and navigation methodologies to that data to provide efficiencies and new insights for users.

Further, embodiments of the inventive system and methods may include implementation of features intended to provide data security, access control, or presentation of a restricted data set to a user. In this regard, these features may include:

The inventive object browser engine determines the different connections between related objects by using database foreign keys+context. So if a user is in an HR context, they might be presented with employee+direct reports+manager, as well as links to other contexts;

Filters may be applied as part of determining the data presented in the visualization, and hence the degree of detail displayed on the UI. Such filters may be UI-driven, 1-time configuration driven, or dynamic, and based on runtime data obtained from the business data processing system and platform-resident applications and data. Examples of possible filters include, but are not limited to the following:

Filter data by real-time performance ratings values—able to reflect employees with certain ratings or ranges;

Filter data by inventory levels as it changes in the warehouse—able to visualize inventory meeting certain availability criteria; or Filter accounts data by various elements, such as accounts where invoices are overdue.

This capability allows visualization of rapidly changing data in a meaningful way. Users can be presented analytical information on criteria that is dynamic and allows them to make decisions in real time;

Data objects may be filtered automatically by context. If, for example, a user in a Human Resources (HR) context, then they will primarily see HR objects (employees, skills, reviews, etc.). If the user switches to another context (sales for example), the user requested data will be filtered for a sales context so they will be presented with prospects, sales orders, leads, etc.;

Data retrieval and presentation requires accessing the data with the correct credential and within the correct context. Based on the context and credentials, different data may be retrieved and displayed by the browser:

For example, a user's credentials would determine what data the user can access and use in generating the displays (e.g., what records/objects, what fields within that record/object, and what rows of data from the system, that is, which entity's or object's data). The combination of these elements ensures that a user is only able to access data that they are authorized to access. A user may be able to see a partial employee object for everyone in the organization (based on publicly available info), but only the secure/private field(s) of the employee records for those employees in the user's reporting line; or Similarly, a user may be able to see invoice objects or revenue projections, but only for those operating units, tasks, or organizations that are tied to his/her area of responsibility and/or geography.

Embodiments of the invention provide a visualization of multiple types of records/objects in a single view. In addition, these embodiments are "intelligent" enough to understand the context of the user's request(s) and make the appropriate API or data retrieval call:

For example, if a user is logged into the system in the context of a Warehouse Management role, and accesses the inventive browser, then the invention will know from the role+application context that the user is requesting visualization with respect to warehouse/logistics, and therefore invoke the appropriate call to the database to retrieve relevant objects (such as warehouse locations, inventory, inventory status, inventory in transit, inventory on order, etc.). These objects would in turn be visualized on the presentation layer;

However, if the user was to access the browser in an HR/HCM context (as a manager role), then the tool would invoke the call that fetches HCM related objects and present that in its unique visualization (e.g., locations, departments, its employees, employee skills etc.).

In general, embodiments of the inventive system and methods provide a visualization tool that enables the access, manipulation, and presentation of data as object(s) and that graphically displays objects that are related to each other at the data level in a more meaningful way:

Embodiments have the ability to visualize different objects as well as related attributes from the data model. The browser is able to navigate the relationships between various objects and present that data to the end user in a meaningful way;

The browser is "smart" and contextual: it is able to determine the user's role(s) and context from which the information is being requested and then present the appropriate related objects. For example, if launched from the context of HR/HCM, then the visualization will focus on the HCM related objects and attributes;

A user is able to navigate hierarchical relationships maintained at the database level, as well as relations in the data model, and present them visually. Embodiments are not bound to use with one type of objects and attributes. Although the visualization can be thought of as a map of the data model, it is based on the inventive system being able to translate the data (e.g., join data elements together to create a simplified and meaningful structure—displaying interconnections between objects that may be defined explicitly in the data, or only inferred by the inventive system's understanding of what the data represents); and The "zoom in" feature of the object browser allows a user to consume different level of details depending on the number of objects/scope/volume of objects being presented. For example, if the user zooms out to take a "bird's eye view", then the browser is able to display high level information for a large number of objects simultaneously. In some embodiments, as the user zooms in, the number of objects being rendered simultaneously will be reduced but additional details (depth) and attributes may be presented.

Figure 7:
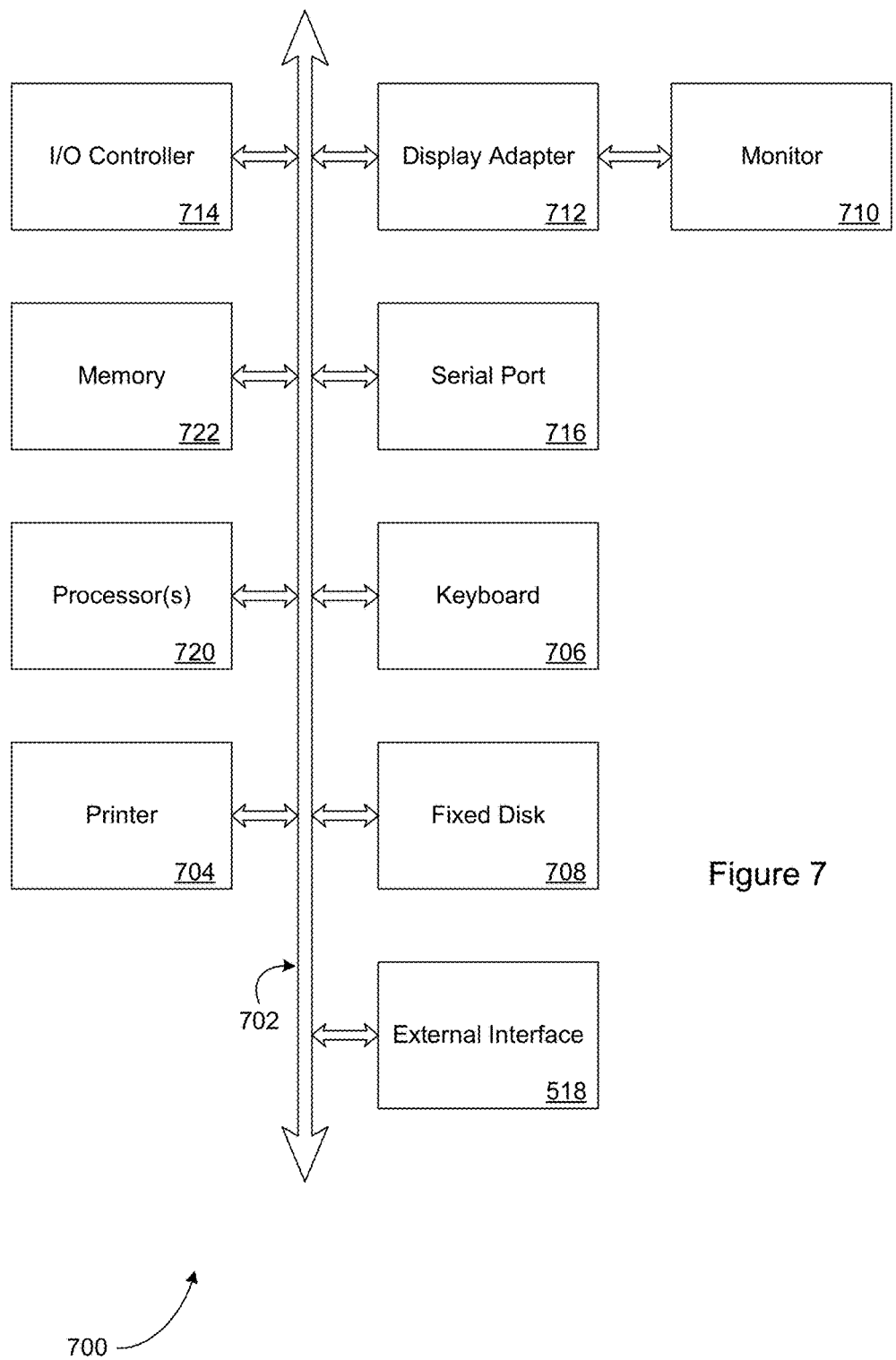
FIG. 7 is a diagram illustrating elements or components that may be present in a computer device or system configured to implement a method, process, function, or operation in accordance with an embodiment of the invention.

In accordance with one embodiment of the invention, the system, apparatus, methods, processes, functions, and/or operations described herein may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 7 is a diagram illustrating elements or components that may be present in a computer device or system 700 configured to implement a method, process, function, or operation in accordance with an embodiment of the invention. The subsystems shown in FIG. 7 are interconnected via a system bus 702. Additional subsystems include a printer 704, a keyboard 706, a fixed disk 708, and a monitor 710, which is coupled to a display adapter 712. Peripherals and input/output (I/O) devices, which couple to an I/O controller 714, can be connected to the computer system by any number of means known in the art, such as a serial port 716. For example, the serial port 716 or an external interface 718 can be utilized to connect the computer device 700 to further devices and/or systems not shown in FIG. 7 including a wide area network such as the Internet, a mouse input device, and/or a scanner. The interconnection via the system bus 702 allows one or more processors 720 to communicate with each subsystem and to control the execution of instructions that may be stored in a system memory 722 and/or the fixed disk 708, as well as the exchange of information between subsystems. The system memory 722 and/or the fixed disk 708 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, Javascript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims is to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A multi-tenant data processing system, comprising:
   one or more business related data processing applications installed in the system and accessible by a plurality of tenants of the multi-tenant data processing system, wherein each tenant is provided an individual instantiation of the data processing applications;
   an electronic data storage element coupled to the one or more business related data processing applications;

an electronic processor configured to execute computer-executable instructions;

a non-transitory computer-readable medium operably connected to the processor and storing computer executable instructions that when executed by the processor cause the system to instantiate an objects browser, the objects browser operating to render a visualization of a plurality of objects, wherein the rendering the visualization includes
  (i) displaying one or more interconnections of an employee object with one or more non-employee objects in the plurality of objects, and
  (ii) determining how to display each of the plurality of objects and each of the interconnections in relation to other of the plurality of objects, based on an association with the employee object;
 determine a set of data contained in the electronic data storage element to be used for generating an initial visualization based at least in part on one or more data fields shared between individual entries of the set of data;
 cause the objects browser to render the initial visualization;
 receive an input indicative of an operation that the objects browser is to perform on the initial visualization;
 determine a context indicated by the input;
 access data associated with an entity in the context; and
 cause the objects browser to render a further visualization of one or more objects and one or more non-hierarchical interconnections between the objects contained in the accessed data, wherein the non-hierarchical interconnections are displayed in a non-hierarchical manner.

2. The multi-tenant data processing system of claim 1, wherein the one or more business related data processing applications include an enterprise resource management (ERP) application, a customer relationship management (CRM), a human capital management (HCM) application, or an eCommerce application.

3. The multi-tenant data processing system of claim 1, wherein the set of data to be used for generating the initial visualization is determined at least in part by a role or function of a user within the organization.

4. The multi-tenant data processing system of claim 1, wherein:
the set of data to be used for generating the initial visualization is determined at least in part by the context; and
the context is determined by a function performed by an application being accessed by the user.

5. The multi-tenant data processing system of claim 1, wherein:
the context is maintained by setting a flag to indicate a current context;
the context is determined for the initial visualization by a role of a user;
the input is a selection of an object representing some aspect of the employee object; and
the context is determined for the further visualization from the selected aspect.

6. The multi-tenant data processing system of claim 1, wherein determining how to display each of the plurality of objects in relation to other of the plurality of objects further comprises rendering each object based on a default visualization structure.

7. The multi-tenant data processing system of claim 1, wherein determining how to display each of the plurality of objects in relation to other of the plurality of objects further comprises rendering each object based on a visualization structure specified by the user.

8. The multi-tenant data processing system of claim 1, wherein the operation that the user requests the objects browser to perform on the initial visualization is operation, wherein the zoom operation further causes a different attribute of one or more of the plurality of objects to be displayed.

9. A system for visualizing data and the relationships between data, the system comprising:
a data store that contains interconnected data objects related to an organization;
a processor configured to execute computer-executable instructions; and
a non-transitory computer-readable medium operably connected to the processor via a communication path and storing computer-executable instructions that when executed by at least the processor cause the processor to:
 render a visualization of a set of the interconnected data objects, wherein the rendering includes
  (i) displaying one or more interconnections of an employee object with one or more non-employee objects in the set with one or more other objects in the set, and
  (ii) determining how to display each object in the set and each interconnection between objects in the set in relation to each other object in the set based on an association with the employee object;
 in response to receiving an input regarding an attribute of the object,
  (i) determine a context indicated by the input, and
  (ii) request that additional data be retrieved from the data store, wherein the additional data includes non-hierarchical interconnections between one or more additional objects, and is selected based at least in part on the attribute and the context;
 once the additional data is received, parse the additional data to identify one or more additional data objects and one or more additional interconnections associated with any of the one or more additional data objects; and
 modify the visualization to display the additional data objects and additional interconnections in relation to one or more objects in the set in a non-hierarchical manner.

10. The system of claim 9, wherein the non-hierarchical interconnections of a data object with an other data object are represented by a unique identifier of the other data object.

11. The system of claim 9, wherein the computer-executable instructions further cause the processor to:
in response to the input of a keyword search,
 (i) identify a subset of objects of the set of the interconnected data objects that match the keyword search; and
 (ii) modify the visualization to highlight each object of the subset of objects.

12. The system of claim 9, wherein the input is a zoom operation, wherein the zoom operation further causes a different attribute of one or more of the plurality of objects to be displayed.

13. The system of claim 9, wherein the input is a focus operation, wherein the focus operation shows all items directly related to the object, and further causes the visualization to retain a central focus on the object, while placing other objects related to the object in a background view.

14. A computer-implemented method for generating a user interface, the method comprising:
   rendering a visualization of a set of interconnected data objects, wherein the rendering includes
   (i) displaying one or more interconnections of an employee object with one or more non-employee objects in the set with one or more other objects in the set, and
   (ii) determining how to display each object in the set and each interconnection between objects in the set in relation to each other object in the set based on an association with the employee object;
   in response to receiving an input regarding an attribute of the object,
   (i) determining a context indicated by the input, and
   (ii) requesting that additional data be retrieved from a data store, wherein the additional data includes non-hierarchical interconnections between one or more additional objects, and is selected based at least in part on the attribute and the context;
   after the additional data is received, parsing the additional data to identify one or more additional data objects and one or more additional interconnections associated with any of the one or more additional data objects; and
   modifying the visualization to display the additional data objects and additional interconnections in relation to one or more objects in the set in a non-hierarchical manner.

15. The method of claim 14, further comprising receiving an additional input that includes a credential of a user of the user interface, wherein the additional data is further selected based at least in part on the credential.

16. The method of claim 14, wherein the non-hierarchical interconnections of a data object with an other data object are represented by a unique identifier of the other data object.

17. The method of claim 16, wherein the unique identifier of the other data object is stored in the data store in a hash table associating a unique identifier of the data object with the unique identifier of the other data object.

18. The method of claim 14, wherein the interconnections of a data object with other data objects are stored in a field on the data object, keyed first on the type of other data object and then on the unique identifier of each other data object.

19. The method of claim 14, further comprising specifying a level of granularity for the additional data, wherein the additional data is further selected based at least in part on the level of granularity.

20. The method of claim 14, further comprising specifying a filter, wherein the additional data is further selected based at least in part on the filter.

* * * * *